3,264,311
ESTERS OF 3-(AMINOSULFINYL)INDOLE-2-CARBOXYLIC ACIDS

Jacob Szmuszkovicz, Kalamazoo, Mich., assignor to The Upjohn Company, Kalamazoo, Mich., a corporation of Delaware
No Drawing. Original application May 2, 1963, Ser. No. 277,455. Divided and this application Sept. 13, 1965, Ser. No. 487,088
6 Claims. (Cl. 260—293.4)

This application is a division of application Serial No. 277,455, filed May 2, 1963, now abandoned.

The present invention relates to novel organic compounds and more particularly relates to novel esters of 3-(aminosulfinyl)indole-2-carboxylic acids.

The novel esters of 3-(aminosulfiinyl)indole-2-carboxylic acids of the present invention can be represented by the formula:

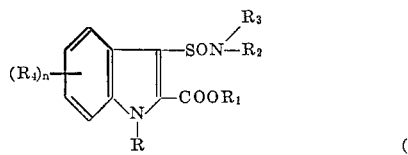

(I)

wherein R represents hydrogen, phenyl, benzyl, p-alkoxybenzyl of 8 to 11 carbon atoms, inclusive, e.g., p-methoxybenzyl, p-ethoxybenzyl, p-propoxybenzyl, p-butoxybenzyl, and the like, and alkyl of 1 to 6 carbon atoms, inclusive, e.g., methyl, ethyl, propyl, isopropyl, butyl, isobutyl, amyl, hexyl, and the like; $R_1$ represents phenyl, benzyl, and alkyl of 1 to 6 carbon atoms, inclusive, e.g., methyl, ethyl, propyl, isopropyl, butyl, isobutyl, amyl, hexyl, and the like; $R_2$ and $R_3$ represent hydrogen and alkyl of 1 to 6 carbon atoms, inclusive, e.g., methyl, ethyl, propyl, isopropyl, butyl, isobutyl, amyl, hexyl, and the like, $R_2$ and $R_3$ when taken together with —N< represent heterocyclic amino of 4 to 6 carbon atoms, inclusive, e.g., morpholino, piperidino, pyrrolidino, thiomorpholino, and hexamethylenimino; $R_4$ represents alkyl of 1 to 4 carbon atoms, inclusive, e.g., methyl, ethyl, propyl, isopropyl, butyl, isobutyl, and the like; and $n$ is an integer from zero to 4, inclusive. When $n$ is less than 4, it is understood that the remaining benzene ring positions are not substituted.

The novel esters of 3-(aminosulfinyl)indole-2-carboxylic acids (Formula I) are produced by reacting an ester of a 3-(halosulfinyl)indole-2-carboxylic acid having the fromula:

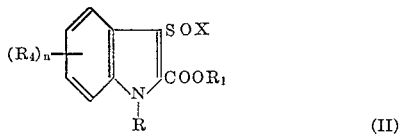

(II)

wherein R, $R_1$, $R_4$ and $n$ have the above values and X represents halogen, e.g., chlorine and bromine, with anhydrous ammonia or an anhydrous primary or secondary amine, i.e., with a basic nitrogenous compound

wherein $R_2$ and $R_3$ have the above values. The reaction is advantageously carried out in the presence of an inert solvent such as ether, benzene, tetrahydrofuran, 1,2-dimethoxyethane, and the like, at a temperature between about —70° C. and about 25° C. Representative primary and secondary amines which can be utilized include methylamine, dimethylamine, ethylamine, diethylamine, propylamine, dipropylamine, butylamine, dibutylamine, amylamine, diamylamine, hexylamine, dihexylamine, morpholine, piperidine, pyrrolidine, thiomorpholine, hexamethylenimine, and the like.

The esters of 3-(halosulfinyl)indole-2-carboxylic acids (Formula II) are prepared by reacting an ester of an indole-2-carboxylic acid having the formula:

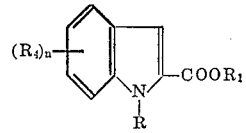

(III)

wherein R, $R_1$, $R_4$ and $n$ have the above values with a thinoyl halide, e.g., thionyl chloride (preferred) or thionyl bromide, at a temperature between about zero and about 35° C., preferably between about 20° C. and about 30° C. The reaction is advantageously carried out in the presence of an inert solvent, e.g., ether, benzene, chloroform, methylene chloride, 1,2-dichloroethane, and the like.

The reaction of thionyl chloride and ethyl indole-2-carboxylate is known (Kunori, Nippon Kagaku Zasshi, 80, 407, 1959; C.A. 55, 5457g, 1961). The art disclosed that the reaction was carried out at a temperature of about 80° C. (refluxing in benzene), but the resulting products were disproportionate products, viz.,

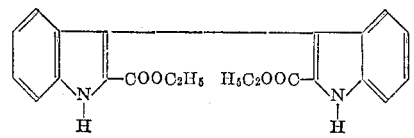

and

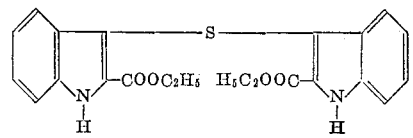

Now it has been unexpectedly found that esters of 3-(halosulfinyl)indole-2-carboxylic acids (Formula II) are obtained instead of disproportionation products of the kind noted above by carrying out the reaction at a temperature between about zero and about 35° C., preferably between about 20° C. and about 30° C.

Esters of indole-2-carboxylic acids (Formula III; R=H) employed in the preparation of esters of 3-(halosulfinyl)indole-2-carboxylic acids (Formula II) can be prepared by utilizing the process disclosed by Brehm, J. Amer. Chem. Soc., 71, 3541, 1949. Brehm prepared ethyl indole-2-carboxylate by reducing and cyclizing ethyl o-nitrophenylpyruvate with hydrogen in the presence of Adams platinum catalyst. The starting ethyl o-nitrophenylpyruvate was prepared by reacting o-nitrotoluene with diethyl oxalate in accordance with the procedure disclosed by Wislicenus et al., Ann. 436, 45, 1924. By substituting other dialkyl oxalates, dibenzyl oxalate, or diphenyl oxalate for diethyl oxalate other suitable esters of o-nitrophenylpyruvic acid which can be utilized herein are prepared. The reduction and cyclization of the pyruvic acid ester can also be accomplished with zinc dust and acetic acid. Esters of Formula III substituted in the 4, 5, 6, or 7 position can be prepared by using a suitably substituted o-nitrotoluene in the Wislicenus process.

1-alkyl and 1-benzyl substituted indole-2-carboxylic acid esters of Formula III can be prepared by reacting an alkyl halide or a benzyl halide with an indole-2-carboxylic acid ester of Formula III in which R is hydrogen, in the presence of an alkaline condensing agent such as alkali-metal amides or alkali-metal hydrides.

Esters of indole-2-carboxylic acids (Formula III) can also be prepared by utilizing the process disclosed by Johnson et al., J. Amer. Chem. Soc., 67, 423, 1945. Johnson et al. prepared methyl-1-methylindole-2-carboxylate and ethyl 1-methylindole-2-carboxylate by cyclizing the 2-methyl-2-phenylhydrazone of pyruvic acid in the presence of an acid medium in accordance with the well-known Fischer indole synthesis, and then esterifying the resulting 1-methylindole-2-carboxylic acid with methanol and hydrogen chloride and ethanol and hydrogen chloride, respectively. This process can also be employed to produce other starting indole-2-carboxylic acid esters by utilizing suitably substituted phenylhydrazines in the preparation of phenylhydrazones of pyruvic acid and employing other alcohols in the esterification step.

The novel esters of 3-(aminosulfinyl)indole-2-carboxylic acids (Formula I) are characterized by antifungal activity which renders them useful in various pharmaceutical dosage forms for administration to the animal organism, including birds and mammals, in the form of creams, lotions, ointments, tablets, capsules, pills, granules, powders, solutions, suspensions or sterile injectables, and in agricultural formulations such as dusts, wettable powders, and sprays for application to living plants. Fungal pathogens against which activity has been noted include: *Alternaria solani, Trichophyton rubrum, Histoplasma capsulatum, Sporotrichum schenckii, Hormodendrum campactum, Blastomyces dermatitidis.*

In addition, the novel esters of 3-(aminosulfinyl)indole-2-carboxylic acids exhibit high absorption of radiation in the wavelength range of 280–300 millimicrons and accordingly can be employed as effective sun screens when incorporated in suitable vehicles such as transparent film-forming compositions and oils.

The following examples are illustrative of the process and product of the present invention, but are not to be construed as limiting.

EXAMPLE 1

*Methyl 1-methyl-3-(aminosulfinyl)indole-2-carboxylate*

A. METHYL 1-METHYL-3-(CHLOROSULFINYL)INDOLE-2-CARBOXYLATE

Thionyl chloride (5 ml.) was added to solid methyl 1-methylindole-2-carboxylate (1.89 g.; 0.01 mole). Solution occurred, followed by vigorous evolution of gas and then solidification. The mixture was allowed to stand for 5 minutes, 15 ml. of anhydrous ether was added, the solid was triturated, filtered, and washed with ether. The solid, methyl 1-methyl-3-(chlorosulfinyl)indole-2-carboxylate, was dried under reduced pressure for 10 minutes, weighed 2.45 g. and melted at 85–88° C. (dec.).

B. METHYL 1-METHYL-3-(AMINOSULFINYL)INDOLE-2-CARBOXYLATE

Methyl 1-methyl-3-(chlorosulfinyl)indole-2-carboxylate prepared from 0.2 mole of methyl 1-methylindole-2-carboxylate was added during 3 minutes to a solution of 150 ml. of liquid ammonia in 300 ml. of ether with stirring and cooling to about —50° C. in a cold bath. The suspension was then stirred for an additional 5 minutes and the cold bath was replaced with tap water to evaporate excess ammonia. Ether was then evaporated under reduced pressure, 200 ml. of water was added, and the solid was filtered and washed well with water (3 portions, each of 100 ml.). Recrystallization from a mixture of 100 ml. of methanol and 100 ml. of water afforded 47.5 g. (94.5 percent yield) of methyl 1-methyl-3-(aminosulfinyl)indole-2-carboxylate which melted at 111–116.5° C.

*Analysis.*—Calcd. for $C_{11}H_{12}N_2O_3S \cdot \frac{1}{4}H_2O$: C, 51.44; H, 4.73; N, 11.17; S, 12.49; $OCH_3$, 12.08. Found: C, 51.27; H, 4.47; N, 11.43; S, 13.01; $OCH_3$, 11.36.

EXAMPLE 2

*Methyl 1-methyl-3-(methylaminosulfinyl)indole-2-carboxylate*

Methyl 1-methyl-3-(chlorosulfinyl)indole-2-carboxylate prepared from 0.2 mole of methyl 1-methylindole-2-carboxylate in accordance with Example 1, Part A, was added during 5 minutes to a solution of methylamine (173 ml.) in 660 ml. of ether with stirring and cooling to —9° C. The temperature rose to 5° C. during the addition and the mixture was maintained at this temperature for 15 minutes. The mixture was evaporated to dryness under reduced pressure, 125 ml. of water was added, and the solid was removed by filtration and washed with water.

The washed solid was recrystallized from ethyl acetate. There was thus obtained 23.5 g. (44 percent yield) of N,1-dimethyl-3-(methylaminosulfinyl)indole - 2 - carboxamide (M.P. 165–168° C.), the structural formula of this compound being:

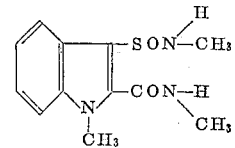

The compound on recrystallization from methanol had a melting point of 171–172° C. The ultraviolet absorption spectrum (in 95 percent ethanol) showed $\lambda_{max}$. 217 m$\mu$ ($\epsilon$=30,500); sh. 225 m$\mu$ ($\epsilon$=28,600); 291 m$\mu$ ($\epsilon$=16,400).

*Analysis.*—Calcd. for $C_{12}H_{15}N_3O_2S$: C, 54.32; H, 5.70; N, 15.83; S, 12.08. Found: C, 54.52; H, 5.79; N, 15.32; S, 11.97; $OCH_3$, nil.

This compound can be incorporated in suitable vehicles such as transparent film-forming compositions and oils to provide effective sun screens.

The filtrate obtained from the above ethyl acetate recrystallization was allowed to stand for 16 hours. The solid which had precipitated was removed by filtration. There was thus obtained 8.72 g. (16 percent yield) of methyl 1-methyl-3-(methylaminosulfinyl)indole-2 - carboxylate; M.P. 137–138° C., unchanged on recrystallization from ethyl acetate.

*Analysis.*—Calcd. for $C_{12}H_{14}N_2O_3S$: C, 54.12; H, 5.30; N, 10.52; S, 12.04; $OCH_3$, 11.65. Found: C, 54.16; H, 5.19; N, 10.32; S, 11.82; $OCH_3$, 10.85.

In the same manner as shown above,

Methyl 1-methyl-3-(ethylaminosulfinyl)indole-2-carboxylate,
Methyl 1-methyl-3-(propylaminosulfinyl)indole-2-carboxylate,
Methyl 1-methyl-3-(butylaminosulfinyl)indole-2-carboxylate,
Methyl 1-methyl-3-(amylaminosulfinyl)indole-2-carboxylate, and
Methyl 1-methyl-3-(hexylaminosulfinyl)indole-2-carboxylate were prepared by substituting ethylamine, proplyamine, butylamine, amylamine, and hexylamine, respectively, for methylamine.

EXAMPLE 3

*Methyl 1-methyl-3-(dimethylaminosulfinyl)indole-2-carboxylate*

Methyl 1-methyl-3-(chlorosulfinyl)indole-2-carboxylate prepared from 0.2 mole of methyl 1-methylindole-2-carboxylate in accordance with Example 1, Part A, was added during 5 minutes to a solution of dimethylamine (180 g.) in 660 ml. of ether with stirring and cooling to 3° C. The mixture was then stirred for 15 minutes and evaporated under reduced pressure. Water (150 ml.) was added and the solid was removed by filtration, washed with water, and recrystallized from methanol. The product, methyl 1-methyl-3-(dimethylaminosulfinyl)indole-2 - carboxylate, weighed 46.5 g. (83 percent yield) and melted at 132–134° C. and on another recrystallization from methanol melted at 134–135° C.

*Analysis.*—Calcd. for $C_{13}H_{16}N_2O_3S$: C, 55.69; H, 5.75; N, 9.99; S, 11.44; $OCH_3$, 11.06. Found: C, 55.71; H, 5.80; N, 9.60; S, 11.20; $OCH_3$, 10.65.

In the same manner as shown above,

Methyl 1-methyl-3-(diethylaminosulfinyl)indole-2-carboxylate,
Methyl 1-methyl-3-(dipropylaminosulfinyl)indole-2-carboxylate,
Methyl 1-methyl-3-(dibutylaminosulfinyl)indole-2-carboxylate,
Methyl 1-methyl-3-(diamylaminosulfinyl)indole-2-carboxylate,
Methyl 1-methyl-3-(dihexylaminosulfinyl)indole-2-carboxylate, and
Methyl 1-methyl-3-(methylethylaminosulfinyl)indole-2-carboxylate were prepared by substituting diethylamine, dipropylamine, dibutylamine, diamylamine, dihexylamine, and methylethylamine, respectively, for dimethylamine.

EXAMPLE 4

*Methyl 1-methyl-3-(piperidinosulfinyl)indole-2-carboxylate*

Methyl 1-methyl-3-(chlorosulfinyl)indole-2-carboxylate prepared from 0.1 mole of methyl 1-methylindole-2-carboxylate in accordance with Example 1, Part A, was added during 3 minutes to a solution of piperidine (17 g.; 0.2 mole) in 150 ml. of ether with stirring and cooling to 2° C. The mixture was then stirred in an ice bath for 2 hours and evaporated to dryness. Water (50 ml.) was added and the solid was filtered and washed with water. On recrystallization from methanol-water, 25.8 g. (78 percent yield) of methyl 1-methyl-3-(piperidinosulfinyl)indole-2-carboxylate was obtained which melted at 102–104° C.

*Analysis.*—Calcd. for $C_{16}H_{20}N_2O_3S$: C, 59.97; H, 6.29; N, 8.75; S, 10.00; $OCH_3$, 9.68. Found: C, 59.83; H, 6.15; N, 8.45; S, 10.04; $OCH_3$, 9.32.

In the same manner as shown above,

Methyl 1-methyl-3-(morpholinosulfinyl)indole-2-carboxylate,
Methyl 1-methyl-3-(pyrrolidinosulfinyl)indole-2-carboxylate,
Methyl 1-methyl-3-(thiomorpholinosulfinyl)indole-2-carboxylate, and
Methyl 1-methyl-3-(hexamethyleniminosulfinyl)indole-2-carboxylate were prepared by substituting morpholine, pyrrolidine, thiomorpholine, and hexamethylenimine, respectively, for piperidine.

EXAMPLE 5

*Ethyl-3-(aminosulfinyl)indole-2-carboxylate*

Thionyl chloride (5 ml.) was added to solid ethyl indole-2-carboxylate (1.89 g.; 0.01 mole). The resulting yellow solution solidified within 5 minutes and was allowed to stand for 1 hour. Anhydrous ether (15 ml.) was added, the suspension was broken up and filtered, and the yellow solid was washed thrice with ether. The yellow solid, ethyl 3-chlorosulfinyl)indole-2-carboxylate, was added during 1 minute to a solution of liquid ammonia (25 ml.) in 50 ml. of ether with stirring and cooling to about −50° C. in a cold bath. A tap water bath was then used to evaporate excess ammonia. The suspension was then evaporated to dryness under reduced pressure. Water was added and the solid was filtered and washed with water. The product, ethyl 3-(amino-sulfinyl)indole-2-carboxylate, weighed 2.2 g. (87 percent yield). On recrystallization from dimethylformamide-ether, the product melted at 169–170° C. (dec.).

*Analysis.*—Calcd. for $C_{11}H_{12}N_2O_3S$: C, 52.36; H, 4.80; N, 11.11; S, 12.71. Found: C, 51.76; H, 5.09; N, 11.15; S, 12.74.

EXAMPLE 6

*Ethyl 1,5-diethyl-3-(ethylaminosulfinyl)indole-2-carboxylate*

In the same manner as shown in Example 1, ethyl 1,5-diethyl-3-(ethylaminosulfinyl)indole-2 - carboxylate was prepared by substituting ethyl 1,5-diethylindole-2-carboxylate and ethylamine for methyl 1-methylindole-2-carboxylate and ammonia, respectively.

EXAMPLE 7

*Phenyl 1-propyl-6-methyl-3-(methylaminosulfinyl)indole-2-carboxylate*

In the same manner as shown in Example 1, phenyl 1-propyl-6-methyl-3-(methylaminosulfinyl)indole - 2 - carboxylate was prepared by substituting phenyl 1-propyl-6-methylindole-2-carboxylate and methylamine for methyl 1-methylindole-2-carboxylate and ammonia, respectively.

EXAMPLE 8

*Benzyl 1-butyl-7-ethyl-3-(methylaminosulfinyl)indole-2-carboxylate*

In the same manner as shown in Example 1, benzyl 1-butyl-7-ethyl-3-(methylaminosulfinyl)indole-2-carboxylate was prepared by substituting benzyl 1-butyl-7-ethylindole-2-carboxylate and methylamine for methyl 1-methylindole-2-carboxylate and ammonia, respectively.

EXAMPLE 9

*Methyl 1-benzyl-4-propyl-3-(aminosulfinyl)indole-2-carboxylate*

In the same manner as shown in Example 1, methyl 1-benzyl-4-propyl-3-(aminosulfinyl)indole - 2 - carboxylate was prepared by substituting methyl 1-benzyl-4-propylindole-2-carboxylate for methyl 1-methylindole - 2 - carboxylate.

EXAMPLE 10

*Methyl 1-amyl-3-(aminosulfinyl)indole-2-carboxylate*

In the same manner as shown in Example 1, methyl 1-amyl-3-(aminosulfinyl)indole-2-carboxylate was prepared by substituting methyl 1-amylindole-2-carboxylate for methyl 1-methylindole-2-carboxylate.

EXAMPLE 11

*Propyl 1-hexyl-3-(aminosulfinyl)indole-2-carboxylate*

In the same manner as shown in Example 1, propyl 1-hexyl-3-(aminosulfinyl)indole-2-carboxylate was prepared by substituting propyl 1-hexylindole-2-carboxylate for methyl 1-methylindole-2-carboxylate.

EXAMPLE 12

*Butyl 5-butyl-3-(aminosulfinyl)indole-2-carboxylate*

In the same manner as shown in Example 1, butyl 5-butyl-3-(aminosulfinyl)indole-2-carboxylate was prepared by substituting butyl 5-butylindole-2-carboxylate for methyl 1-methylindole-2-carboxylate.

EXAMPLE 13

*Amyl 1-methyl-3-(dimethylaminosulfinyl)indole-2-carboxylate*

In the same manner as shown in Example 1, amyl 1-methyl-3-(dimethylaminosulfinyl)indole - 2 - carboxylate was prepared by substituting amyl 1-methylindole-2-carboxylate and dimethylamine for methyl 1-methylindole-2-carboxylate and ammonia, respectively.

EXAMPLE 14

*Hexyl 1-methyl-3-(aminosulfinyl)indole-2-carboxylate*

In the same manner as shown in Example 1, hexyl 1-methyl-3-(aminosulfinyl)indole-2-carboxylate was prepared by substituting hexyl 1-methylindole-2-carboxylate for methyl 1-methylindole-2-carboxylate.

EXAMPLE 15

*Ethyl 1-ethyl-4,7-dimethyl-3-(aminosulfinyl)indole-2-carboxylate*

In the same manner as shown in Example 1, ethyl 1-ethyl-4,7-dimethyl-3-(aminosulfinyl)indole-2 - carboxylate was prepared by substituting ethyl 1-ethyl-4,7-dimethylindole-2-carboxylate for methyl 1-methylindole - 2 - carboxylate.

EXAMPLE 16

*Methyl 1-(p-methoxybenzyl)-3-(methylaminosulfinyl) indole-2-carboxylate*

In the same manner as shown in Example 1, methyl 1-(p-methoxybenzyl)-3 - (methylaminosulfinyl)indole - 2-carboxylate was prepared by substituting methyl 1-(p-methoxybenzyl)indole-2-carboxylate and methylamine for methyl 1-methylindole-2-carboxylate and ammonia, respectively.

EXAMPLE 17

*Methyl 1-(p-ethoxybenzyl)-3-(aminosulfinyl)indole-2-carboxylate*

In the same manner as shown in Example 1, methyl 1-(p-ethoxybenzyl)-3-(aminosulfinyl)indole-2 - carboxylate was prepared by substituting methyl 1-(p-ethoxybenzyl)indole-2-carboxylate for methyl 1-methylindole-2-carboxylate.

EXAMPLE 18

*Methyl 1-(p-propoxybenzyl)-3-(piperidinosulfinyl) indole-2-carboxylate*

In the same manner as shown in Example 1, methyl 1-(p-propoxybenzyl)-3-(piperidinosulfinyl)indole - 2 - carboxylate was prepared by substituting methyl 1-(p-propoxybenzyl)indole-2-carboxylate and piperidine for methyl 1-methylindole-2-carboxylate and ammonia, respectively.

EXAMPLE 19

*Methyl 1-(p-butoxybenzyl)-3-(aminosulfinyl)indole-2-carboxylate*

In the same manner as shown in Example 1, methyl 1-(p-butoxybenzyl)-3-(aminosulfinyl)indole-2 - carboxylate was prepared by substituting methyl 1-(p-butoxybenzyl)indole-2-carboxylate for methyl 1-methylindole-2 - carboxylate.

EXAMPLE 20

*Methyl 1-phenyl-7-methyl-3-(methylaminosulfinyl) indole-2-carboxylate*

In the same manner as shown in Example 1, methyl 1-phenyl-7-methyl-3-(methylaminosulfinyl)indole - 2 - carboxylate was prepared by substituting methyl 1-phenyl-7-methylindole-2-carboxylate and methylamine for methyl 1-methylindole-2-carboxylate and ammonia, respectively.

I claim:

1. An ester of 3-(aminosulfinyl)indole-2-carboxylic acids having the formula:

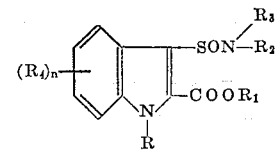

wherein R is selected from the group consisting of hydrogen, phenyl, benzyl, p-alkoxybenzyl of 8 to 11 carbon atoms, inclusive, and alkyl of 1 to 6 carbon atoms, inclusive, $R_1$ is selected from the group consisting of phenyl, benzyl, and alkyl of 1 to 6 carbon atoms, inclusive, $R_2$ and $R_3$ are selected from the group consisting of hydrogen and alkyl of 1 to 6 carbon atoms, inclusive, and $R_2$ and $R_3$ when taken together with —N< also represent heterocyclic amino of 4 to 6 carbon atoms, inclusive, selected from the group consisting of morpholino, piperidino, pyrrolidino, thiomorpholino, and hexamethylenimino, $R_4$ represents alkyl of 1 to 4 carbon atoms, inclusive, and $n$ is an integer from zero to 4.

2. Methyl 1-methyl-3-(aminosulfinyl)indole-2-carboxylate.

3. Methyl 1-methyl-3-(methylaminosulfinyl)indole - 2-carboxylate.

4. Methyl 1-methyl-3 - (dimethylaminosulfinyl)indole-2-carboxylate.

5. Methyl 1-methyl-3-(piperidinosulfinyl)indole-2-carboxylate.

6. Ethyl 3-(aminosulfinyl)indole-2-carboxylate.

No references cited.

WALTER A. MODANCE, *Primary Examiner.*

AVROM D. SPEVACK, *Assistant Examiner.*